(12) United States Patent
Dai et al.

(10) Patent No.: US 12,221,758 B2
(45) Date of Patent: Feb. 11, 2025

(54) BUFFERING FISHWAY SUITABLE FOR EMERGENT FLOOD DISCHARGE WITH REDUCTION IN DAMAGE AND BUFFERING METHOD THEREOF

(71) Applicants: CHINA THREE GORGES CORPORATION, Hubei (CN); CHINA THREE GORGES UNIVERSITY, Hubei (CN)

(72) Inventors: Huichao Dai, Hubei (CN); Junjun Tan, Hubei (CN); Dingguo Jiang, Hubei (CN); Xiaotao Shi, Hubei (CN); Zhenbiao Liu, Hubei (CN); Yu Wang, Hubei (CN)

(73) Assignees: CHINA THREE GORGES CORPORATION (CN); CHINA THREE GORGES UNIVERSITY (CN)

( * ) Notice: Subject to any disclaimer, the term of this patent is extended or adjusted under 35 U.S.C. 154(b) by 0 days.

(21) Appl. No.: 18/032,478

(22) PCT Filed: Mar. 4, 2022

(86) PCT No.: PCT/CN2022/079315
§ 371 (c)(1),
(2) Date: Apr. 18, 2023

(87) PCT Pub. No.: WO2022/206284
PCT Pub. Date: Oct. 6, 2022

(65) Prior Publication Data
US 2023/0392333 A1    Dec. 7, 2023

(30) Foreign Application Priority Data

Mar. 29, 2021 (CN) .......................... 202110332278.9

(51) Int. Cl.
*E02B 8/08* (2006.01)
(52) U.S. Cl.
CPC .................................. *E02B 8/085* (2013.01)
(58) Field of Classification Search
CPC .................................. E02B 8/08; E02B 8/085
(Continued)

(56) References Cited

FOREIGN PATENT DOCUMENTS

| CN | 210917258 U | 7/2020 |
| CN | 212270867 U | 1/2021 |

(Continued)

OTHER PUBLICATIONS

International Search Report of PCT/CN2022/079315.
Written Opinion of PCT/CN2022/079315.

*Primary Examiner* — Sunil Singh

(57) ABSTRACT

The present disclosure discloses a buffering fishway suitable for emergent flood discharge with reduction in damage and a buffering method thereof. The buffering fishway includes a fishway body, wherein a migration passage is arranged inside the fishway body, one end of which is rotationally connected with a fixing base, and the other end of which is rotationally connected with a counterweighting floating dock, and a plurality of buffering plates capable of swinging are hinged inside the migration passage, furthermore, the present disclosure also provides a buffering method corresponding to it. The present disclosure effectively reduces the potential energy of the flood and weakens the impact force on the fish. Therefore, the gate dam having this design effectively avoids the fish in the fishway from being fiercely impacted by the flood and easily resulting in damage during discharging flood, having a high protective effect on the fish.

14 Claims, 6 Drawing Sheets

(58) Field of Classification Search
USPC .................................... 405/81, 82; 119/219
See application file for complete search history.

(56) References Cited

FOREIGN PATENT DOCUMENTS

| | | | |
|---|---|---|---|
| CN | 113062281 A | | 7/2021 |
| FR | 3003582 | * | 9/2014 |
| JP | 04182507 A | | 6/1992 |
| JP | 0959965 A | | 3/1997 |
| JP | 2797700 | * | 9/1998 |
| WO | 2005033420 A1 | | 4/2005 |

* cited by examiner

BUFFERING FISHWAY SUITABLE FOR EMERGENT FLOOD DISCHARGE WITH REDUCTION IN DAMAGE AND BUFFERING METHOD THEREOF

CROSS-REFERENCE TO RELATED APPLICATIONS

This Application is a national stage application of PCT/CN2022/079315. This application claims priorities from PCT Application No. PCT/CN2022/079315, filed Mar. 4, 2022, and from the Chinese patent application 202110332278.9 filed Mar. 29, 2021, the content of which are incorporated herein in the entirety by reference.

TECHNICAL FIELD

The present disclosure relates to the technical field of fishway design, in particular to a buffering fishway suitable for emergent flood discharge with reduction in damage and a buffering method thereof.

BACKGROUND

Upward tracing behaviors of fish are mainly considered for a fishway design. At the downstream of a gate dam, fish are often subject to the attraction of water flow, so as to enter the fishway. Fish swim upstream by themselves overcoming the flow velocity in the fishway. The fishway consists of an inlet, a tank, an outlet and a fish-trapping and water-supplementing system. The inlet is mostly arranged on a bank having a stable water flow and a certain water depth, and positioned near a power station or an outlet of an overflow dam. The tank body, commonly used, has a rectangular cross-section, and its water level divided into several small steps between its upstream and downstream by means of a baffle plate provided with fish holes, making use of a cushion of the water and friction along the course, and countering and diffusing water flow to eliminate excess energy. Due to different hole shapes, the fishway can be divided into a dam type, a flooded orifice type, a vertically-slit type, a combined type and the likes. When the gate dam is discharging flood, the fish in the fishway will be fiercely impacted by the flood, easily resulting in damage, and the fishway in the prior art is usually relatively simple in structure without a buffering device, resulting in a low protective effect on the fish.

SUMMARY

The present disclosure aims to overcome the above defect by providing a buffering fishway suitable for emergent flood discharge with reduction in damage and a buffering method thereof, so as to solve the problem mentioned in the background art.

In order to solve the above technical problem, the technical scheme adopted in the present disclosure is as follows:

A buffering fishway suitable for emergent flood discharge with reduction in damage, comprising a fishway body, a migration passage is arranged inside the fishway body, wherein one end of the fishway body is rotationally connected with a fixing base, the other end of the fishway body is rotationally connected with a counterweighting floating dock, and a plurality of buffering plates capable of swinging are hinged inside the migration passage.

Preferably, the buffering plates are equidistant and parallel to each other in the length direction within the migration passage, and transmission connecting rods are arranged between each buffering plate, and rotationally connected to the sides of the buffering plates.

Preferably, a crank rocker mechanism is further arranged inside the migration passage, and the input end of one of the buffering plates is connected to the output end of the crank rocker mechanism.

Preferably, the input end of the crank rocker mechanism is connected to the output end of a turbine deceleration device, the input end of the turbine deceleration device is connected to the output end of a flood discharging turbine, and the flood discharging turbine and the turbine deceleration device are both installed outside the fishway body.

Preferably, the flood discharging turbines are several, the shafts on both sides of the flood discharging turbines are held in the bearings on a mounting frame, a chain wheel is installed on one side of each flood discharging turbine, and a plurality of chain wheels are connected with each other by means of a transmission chain.

Preferably, the crank rocker mechanism includes a driving crank, one end of which is rotationally connected with the output end of the turbine deceleration device, and the other end of which is rotationally connected with one end of a crank linkage, the other end of the crank linkage is rotationally connected to one end of a rocker, the other end of the rocker is connected to the center of a first gear by means of a rotary shaft, among the buffering plates, one's the pin shaft is connected to the center of a second gear, the first gear and the second gear mesh with each other, the rotary shaft of the rocker and the pin shaft of the buffering plate are both held on the sides of the fishway body by mean of the bearing frames.

Preferably, the turbine deceleration device includes a housing, inside which a second small gear and a second big gear are hinged, the second small gear is coaxially fixed with a first big gear, which meshes with a first small gear, the first small gear is coaxially fixed with the flood discharging turbine, the second small gear meshes with the second big gear, which meshes with a driven gear coaxially fixed with the driving crank.

Preferably, the counterweighting floating dock includes a floating tank and a drainage pump, the floating tank is rotationally connected with the lower end of the fishway body, and the drainage pump is fixedly installed on the floating tank.

The present disclosure further discloses a buffering method of the buffering fishway, comprising the following steps:

S1): from starting of the drainage pump, pumping out the water in the floating tank quantitatively for controlling the water volume of the floating tank, thus adjusting the inclination angle of the fishway body, so as to cope with different flood discharge conditions;

S2): discharging flood, which flows to drive the flood-discharging turbine to rotate, then causing the turbine deceleration device to drive the crank rocker mechanism to run;

S3): enabling the crank rocker mechanism to drive one of the buffering plates to swing in the migration passage, further causing a plurality of buffering plates to swing together in the migration passage; and S4): enabling the buffering plates to push upwards the water flowing downwards during its upward swinging, functioning as a buffer.

Preferably, in S1, at the time of meeting a big flood discharge volume, the drainage pump pumps out the water in the floating tank quantitatively, then the floating tank floats up a certain distance, so that the fishway body is tilted upwards at a certain angle, so as to enable the flood flow to pass through more flood discharging turbines to enhance the buffering effect; at the time of meeting a small flood discharge volume, the inlet valve of the floating tank keeps open for a period of time, then the floating tank sinks a certain distance after the water has gotten in, so that the fishway body is tilted downwards at a certain angle, so as to enable the flood flow to pass through less flood discharging turbines to reduce the buffering effect.

The present disclosure has the following beneficial effects:

1. At the time of discharging flood, the flow of the flood drives the flood-discharging turbine to rotate, which drives the buffering plate to swing in the migration passage by means of the crank rocker mechanism. The buffering plate gives upward pushing force during swinging, functioning as a buffer, and it can also properly buffer a torrent during swinging downwards. Furthermore, as the buffering plate swings and the flood discharging turbine rotates, meanwhile they continuously do work, so as to effectively reduce the potential energy of the flood and weaken the impact force on the fish. Therefore, the gate dam having this design effectively avoids the fish in the fishway from being fiercely impacted by the flood and easily resulting in damage during discharging flood, having a high protective effect on the fish.
2. The driving crank drives the rocker to swing by means of the crank linkage during its circular motion, and the rocker swings driving one buffering plate connected to it to swing, then the buffering plate connected to the rocker swings driving the other buffering plates. The rocker is characterized with a sharp return during rotation, so that the buffering plate driven by the rocker can quickly push upwards the water flowing downwards during its upward swinging, enhancing an buffering effect.
3. The turbine deceleration device performs multi-stage deceleration, enabling the swing speed of the rocker to effectively reduce, and preventing the buffering plate from damaging the fish due to an excessive swing.
4. From starting of the drainage pump, the water in the floating tank can be pumped out quantitatively for controlling the water volume of the floating tank, thus this way can adjust the inclination angle of the fishway body 1, so as to cope with different flood discharge conditions. For example, at the time of meeting a big flood discharge volume, the drainage pump pumps out the water in the floating tank quantitatively, then the floating tank floats up a certain distance, so that the fishway body is tilted upwards at a certain angle, so as to enable the flood flow to pass through more flood discharging turbines to enhance the buffering effect; at the time of meeting a small flood discharge volume, the inlet valve of the floating tank keeps open for a period of time, then the floating tank sinks a certain distance after the water has gotten in, so that the fishway body is tilted downwards at a certain angle, so as to enable the flood flow to pass through less flood discharging turbines to reduce the buffering effect.

DETAILED DESCRIPTION OF SOME EMBODIMENTS

Figure 1:
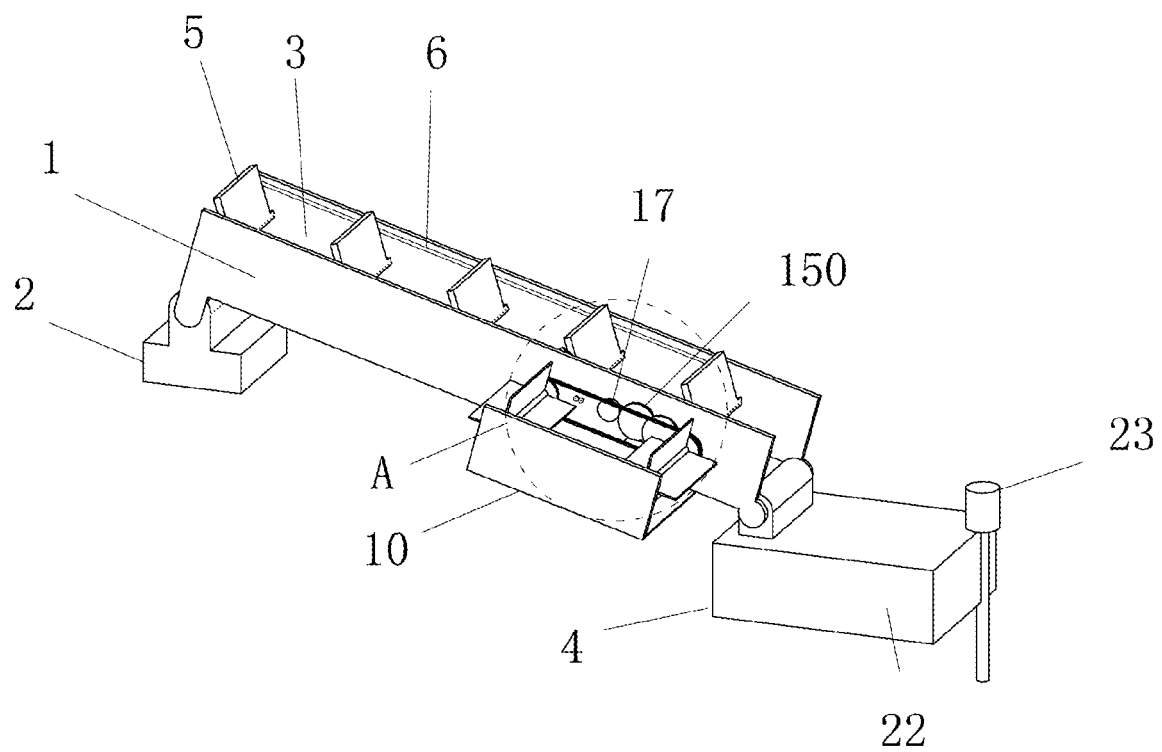
FIG. 1 is a steric structure diagram of the buffering fishway suitable for emergent flood discharge with reduction in damage.
Figure 2:
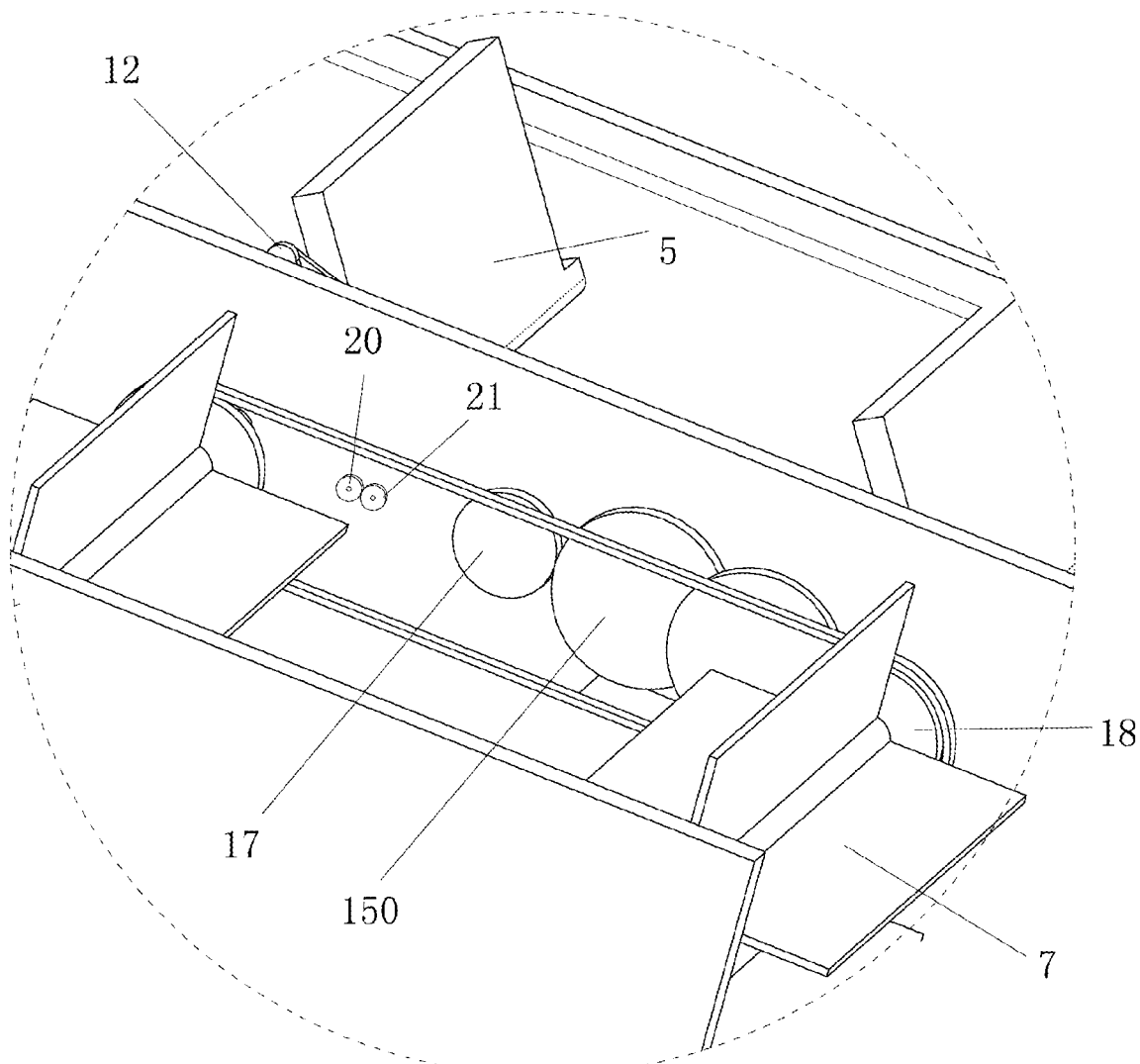
FIG. 2 is an enlarged structure diagram at A in FIG. 1.
Figure 3:
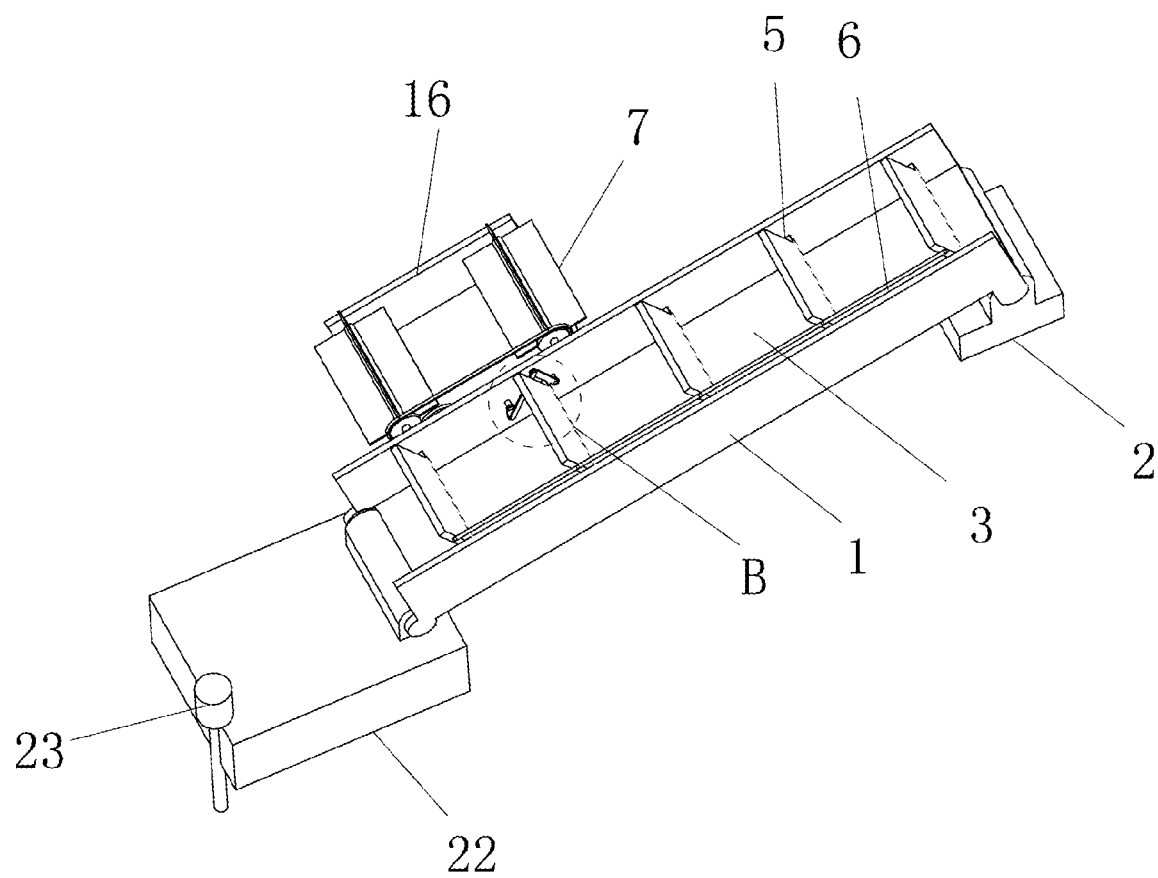
FIG. 3 is a steric structure diagram of the buffering fishway suitable for emergent flood discharge with reduction in damage from another view.

We shall further describe the present disclosure in detail in combination with the drawings and examples as follows.

As shown in FIGS. 1~6, a buffering fishway suitable for emergent flood discharge with reduction in damage includes the fishway body 1, wherein the migration passage 3 is arranged inside the fishway body 1, one end of which is rotationally connected with the fixing base 2, and the other end of which is rotationally connected with the counterweighting floating dock 4, and a plurality of buffering plates 5 capable of swinging are hinged inside the migration passage 3.

Preferably, the buffering plates 5 are equidistant and parallel to each other in the length direction within the migration passage 3, and the transmission connecting rods 6 are arranged between each buffering plate 5, and rotationally connected to the sides of the buffering plates In this design, the swing of one buffering plate 5 can drive a plurality of buffering plates 5 to swing together.

Preferably, a crank rocker mechanism 8 is further arranged inside the migration passage 3, and the input end of one of the buffering plates 5 is connected to the output end of the crank rocker mechanism 8.

Preferably, the input end of the crank rocker mechanism 8 is connected to the output end of a turbine deceleration device 9, the input end of the turbine deceleration device 9 is connected to the output end of a flood discharging turbine 7, and the flood discharging turbine 7 and the turbine deceleration device 9 are both installed outside the fishway body 1.

Preferably, the flood discharging turbines 7 are several, the shafts on both sides of the flood discharging turbines 7 are held in the bearings on the mounting frame 16, the chain wheel 18 is installed on one side of each flood discharging turbine 7, and a plurality of chain wheels 18 are connected with each other by means of the transmission chain 19. This design provides a plurality of flood discharging turbines 7 combined with them by means of the chain wheels 18 and the transmission chain 19, which drive them to do work together, so that it can fast reduce the potential energy of the flood, and increase the buffering efficiency.

Figure 4:
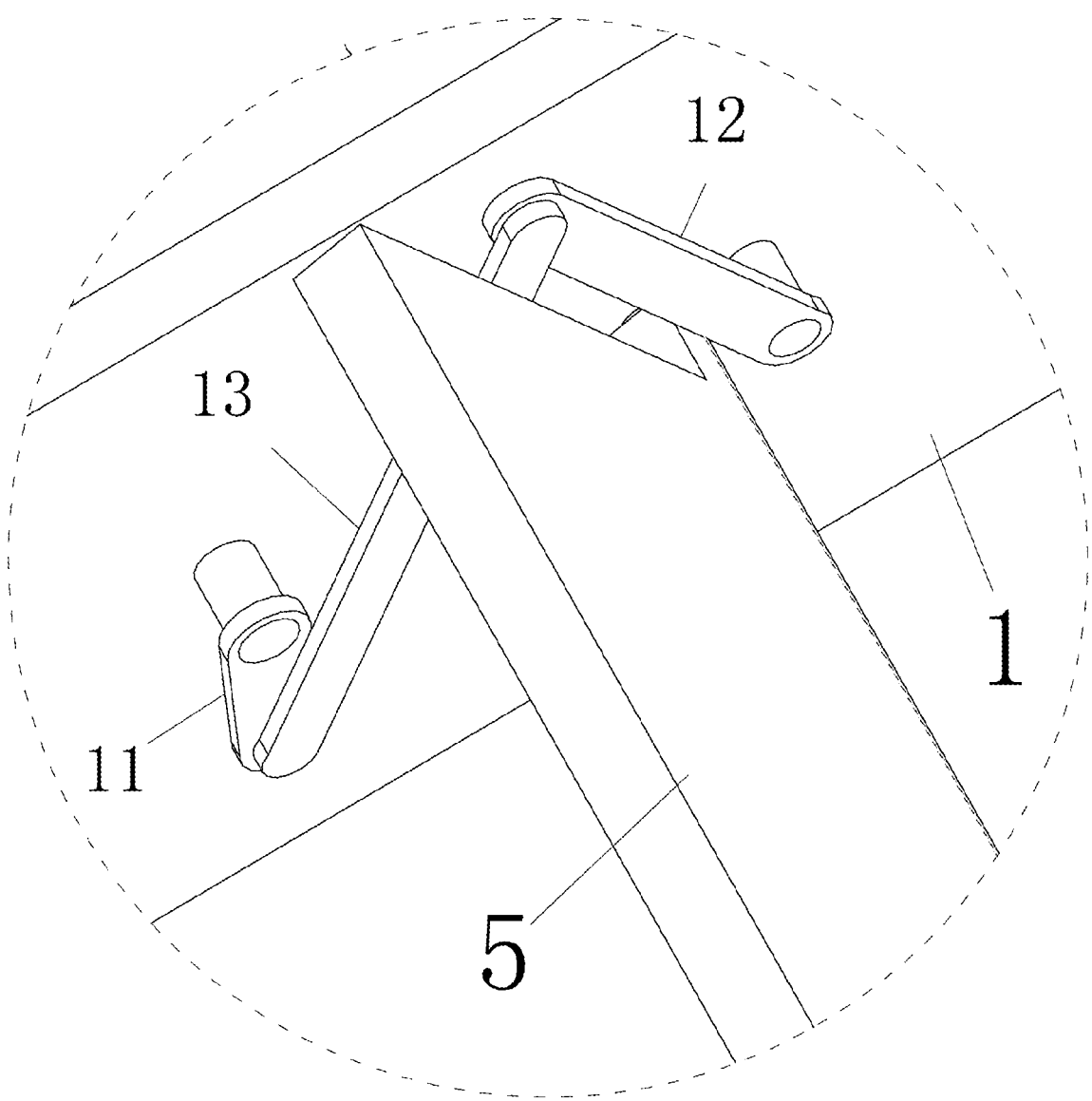
FIG. 4 is an enlarged structure diagram at B in FIG. 3.
Figure 5:
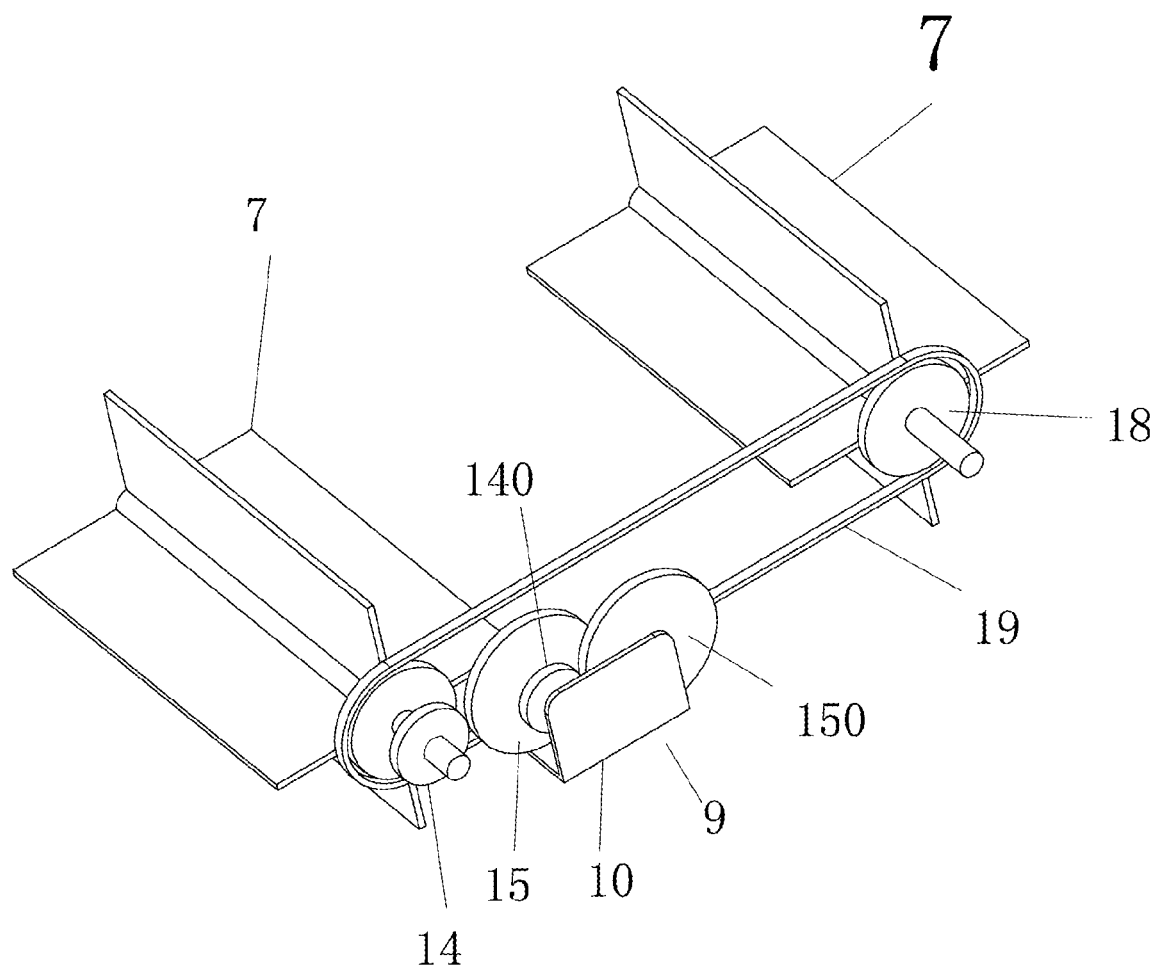
FIG. 5 shows a structure diagram how to fit the flood discharging turbine with the turbine deceleration device.
Figure 6:
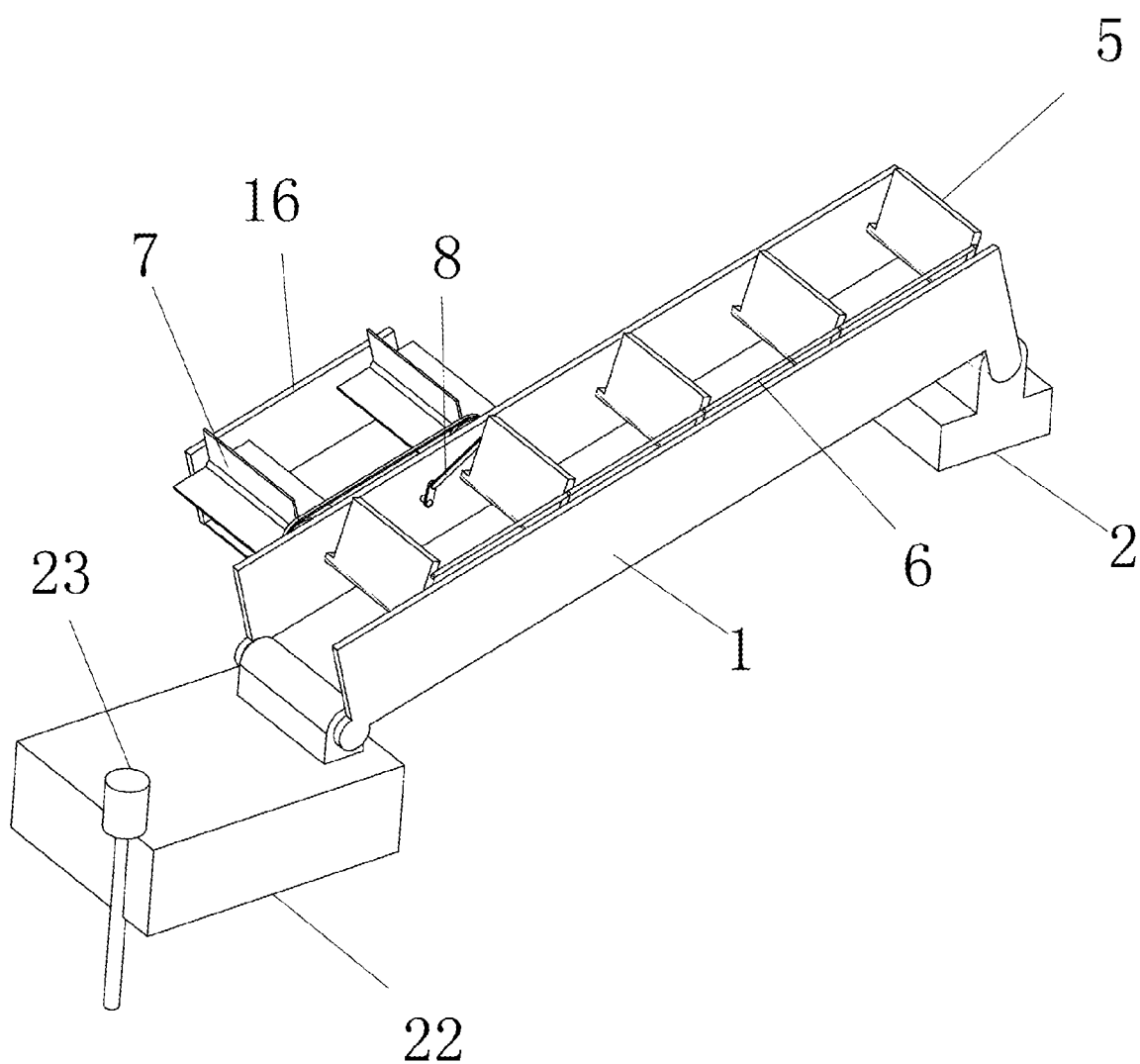
FIG. 6 is a structure diagram of the buffering fishway suitable for emergent flood discharge with reduction in damage, at the time that the buffering plate within it swings upwards.

Preferably, the crank rocker mechanism 8 includes the driving crank 11, one end of which is rotationally connected with the output end of the turbine deceleration device 9, and the other end of which is rotationally connected with one end of the crank linkage 13, the other end of the crank linkage 13 is rotationally connected to one end of the rocker 12, the other end of the rocker is connected to the center of the first gear 20 by means of a rotary shaft. Among the buffering plates 5, one's the pin shaft is connected to the center of the second gear 21, the first gear 20 and the second gear 21 mesh with each other, the rotary shaft of the rocker 12 and the pin shaft of the buffering plate 5 are all held on the sides of the fishway body 1 by mean of bearing frames. As shown in FIG. 4, when the driving crank 11 rotates, it can drive the crank linkage 13 to swing, further enables the rocker 12 to swing upwards and downwards periodically. The length of the driving crank 11 is designed to be significantly shorter than the length of the rocker 12, so a circular motion made by the driving crank 11 only leads to a periodical upward and downward swing of the rocker 12.

Preferably, the turbine deceleration device 9 includes the housing 10, inside which the second small gear 140 and the second big gear 150 are hinged, the second small gear 140 is coaxially fixed with the first big gear 15, which meshes with the first small gear 14, the first small gear 14 is coaxially fixed with the flood discharging turbine 7, the second small gear 140 meshes with the second big gear 150, which meshes with the driven gear 17 coaxially fixed with the driving crank 11. When the flood discharging turbine 7 rotates, it drives the first small gear 14 to rotate, then drives the first big gear 15 and the second small gear 140 to rotate, next drives the second big gear 150 to rotate, and finally drives the driven gear 17 to rotate, so that the driving crank 11 rotates. Since the diameter of the first small gear 14 is smaller than the diameter of the first big gear 15, the first small gear 14 and the first big gear are set to perform first-stage deceleration. The second small gear 140 and the first big gear rotate at the same speed, so the second small 140 and the second big gear 150 are set to perform second-stage deceleration. This design can effectively decrease the rotation speed of the driving crank 11, thereby slowing down the swing speed of the rocker 12, and preventing the buffering plate 5 from hurting the fish due to an excessive swing.

Preferably, the counterweighting floating dock 4 includes the floating tank 22 and the drainage pump 23, the floating tank 22 is rotationally connected with the lower end of the fishway body 1, and the drainage pump 23 is fixedly installed on the floating tank 22. This design enables the water in the floating tank 22 to be pumped out quantitatively from starting of the drainage pump 23 for controlling the water volume of the floating tank 22, thus adjust the inclination angle of the fishway body 1, so as to cope with different flood discharge conditions.

The present disclosure further discloses a buffering method of the buffering fishway, which includes the following steps:

S1): From starting of the drainage pump 23, pumping out the water in the floating tank 22 quantitatively for controlling the water volume of the floating tank 22, thus adjusting the inclination angle of the fishway body 1, so as to cope with different flood discharge conditions.

S2): Discharging flood, which flows to drive the flood-discharging turbine 7 to rotate, then causing the turbine deceleration device 9 to drive the crank rocker mechanism 8 to run. Specifically, when the flood discharging turbine 7 rotates, it drives the first small gear 14 to rotate, then drives the first big gear 15 and the second small gear 140 to rotate, next drives the second big gear 150 to rotate, and finally drives the driven gear 17 to rotate, so that the driving crank 11 rotates. When the driving crank 11 rotates, it can drive the crank linkage 13 to swing, further enables the rocker 12 to swing upwards and downwards periodically. As the other end of the rocker 12 is connected to the center of the first gear 20 by means of a rotary shaft, and among the buffering plates 5, one's the pin shaft is connected to the center of the second gear 21, the first gear 20 drives the second gear 21 to rotate, further drives this buffering plate 5 to swing periodically, and then drives the other buffering plates 5 to swing together by means of the transmission connecting rods 6. The buffering plates 5 give upward pushing force during swinging, functioning as a buffer, and they can also properly buffer a torrent during swinging downwards. Furthermore, as the buffering plates 5 swing and the flood discharging turbine 7 rotates, meanwhile they continuously do work, so as to effectively reduce the potential energy of the flood and heavily weaken the impact force on the fish. Moreover, the rocker 12 is characterized with a sharp return during rotation, so that the buffering plates 5 driven by the rocker 12 can quickly push upwards the water flowing downwards during its upward swinging, functioning as a buffer.

S3): Enabling the crank rocker mechanism 8 to drive one of the buffering plates 5 to swing in the migration passage 3, further causing a plurality of buffering plates 5 to swing together in the migration passage 3.

S4): Enabling the buffering plates 5 to push upwards the water flowing downwards during its upward swinging, functioning as a buffer.

Preferably, in S1, at the time of meeting a big flood discharge volume, the drainage pump 23 pumps out the water in the floating tank 22 quantitatively, then the floating tank 22 floats up a certain distance, so that the fishway body 1 is tilted upwards at a certain angle, so as to enable the flood flow to pass through more flood discharging turbines 7 to enhance the buffering effect; at the time of meeting a small flood discharge volume, the inlet valve of the floating tank 22 keeps open for a period of time, then the floating tank 22 sinks a certain distance after the water has gotten in, so that the fishway body 1 is tilted downwards at a certain angle, so as to enable the flood flow to pass through less flood discharging turbines 7 to reduce the buffering effect.

The above embodiments are only preferred technical solutions of the present disclosure, and should not be regarded as limiting the present disclosure. The embodiments in the present application and the features in the embodiments can be arbitrarily combined with each other without conflict. The scope of protection of the present disclosure shall be the technical solutions recorded in the claims, including the equivalent alternatives of the technical features in the technical solutions recorded in the claims. Equivalent substitutions and improvements in the scope are also included in the scope of protection of the present disclosure.

What is claimed is:

1. A buffering fishway suitable for emergent flood discharge with reduction in damage, comprising a fishway body (1), a migration passage (3) is arranged inside said fishway body (1), wherein one end of said fishway body (1) is rotationally connected with a fixing base (2), the other end of said fishway body (1) is rotationally connected with a counterweighting floating dock (4), and a plurality of buffering plates (5) capable of swinging are hinged inside said migration passage (3), wherein said buffering plates (5) are equidistant and parallel to each other in a length direction within said migration passage (3), and transmission connecting rods (6) are arranged between the buffering plates (5), and rotationally connected to the sides of said buffering plates (5), a crank rocker mechanism (8) is further arranged inside said migration passage (3), and an input end of one of said buffering plates (5) is connected to an output end of the crank rocker mechanism (8),
an input end of the crank rocker mechanism (8) is connected to an output end of a turbine deceleration device (9), an input end of the turbine deceleration device (9) is connected to an output end of a flood discharging turbine (7), and the flood discharging turbine (7) and the turbine deceleration device (9) are both installed outside said fishway body (1).

2. The buffering fishway suitable for emergent flood discharge with reduction in damage according to claim 1, wherein a plurality of flood discharging turbines (7) are provided, shafts on both sides of the flood discharging turbines (7) are held in bearings on a mounting frame (16), a chain wheel (18) is installed on one side of each flood discharging turbine (7), and a plurality of chain wheels (18) are connected with each other by a transmission chain (19).

3. The buffering fishway suitable for emergent flood discharge with reduction in damage according to claim 1, wherein the crank rocker mechanism (8) includes a driving crank (11), one end of which is rotationally connected with the output end of the turbine deceleration device (9), and the other end of which is rotationally connected with one end of a crank linkage (13), the other end of the crank linkage (13) is rotationally connected to one end of a rocker (12), the other end of the rocker (12) is connected to the center of a first gear (20) by a rotary shaft, among said buffering plates (5), a pin shaft of one of the buffering plates (5) is connected to the center of a second gear (21), the first gear (20) and the second gear (21) mesh with each other, the rotary shaft of the rocker (12) and the pin shaft of said buffering plate (5) are both held on one side of said fishway body (1) by bearing frames.

4. The buffering fishway suitable for emergent flood discharge with reduction in damage according to claim 3, wherein the turbine deceleration device (9) includes a housing (10), inside which a second small gear (140) and a second big gear (150) are hinged, the second small gear (140) is coaxially fixed with a first big gear (15), which meshes with a first small gear (14), the first small gear (14) is coaxially fixed with the flood discharging turbine (7), the second small gear (140) meshes with the second big gear (150), which meshes with a driven gear (17) coaxially fixed with the driving crank (11).

5. The buffering fishway suitable for emergent flood discharge with reduction in damage according to claim 1, wherein said counterweighting floating dock (4) includes a floating tank (22) and a drainage pump (23), the floating tank (22) is rotationally connected with the lower end of said fishway body (1), and the drainage pump (23) is fixedly installed on the floating tank (22).

6. A buffering method of the buffering fishway according to claim 1, comprising the following steps:
S1): from starting of a drainage pump (23), pumping out the water in a floating tank (22) quantitatively for controlling the water volume of the floating tank (22), thus adjusting the inclination angle of said fishway body (1), so as to cope with different flood discharge conditions;
S2): discharging flood, which flows to drive the flood-discharging turbine (7) to rotate, then causing a turbine deceleration device (9) to drive a crank rocker mechanism (8) to run;
S3): enabling the crank rocker mechanism (8) to drive one of the plurality of buffering plates (5) to swing in said migration passage (3), further causing the plurality of buffering plates (5) to swing together in said migration passage (3); and
S4): enabling said buffering plates (5) to push upwards the water flowing downwards during its upward swinging, functioning as a buffer.

7. The buffering method according to claim 6, wherein in S1, at the time of meeting a big flood discharge volume larger than a first preset value, pumping out, by the drainage pump (23), the water in the floating tank (22) quantitatively, then floating the floating tank (22) up a certain distance, so that said fishway body (1) is tilted upwards at a certain angle, so as to enable the flood to pass through more flood discharging turbines (7) to enhance a buffering effect; at the time of meeting a flood discharge volume less than a second preset value, an inlet valve of the floating tank (22) keeps open for a period of time, then sinking the floating tank (22) a certain distance after the water has gotten in, so that said fishway body (1) is tilted downwards at a certain angle, so as to enable the flood to pass through less flood discharging turbines (7) to reduce the buffering effect.

8. The buffering method of claim 6, wherein said buffering plates (5) are equidistant and parallel to each other in the length direction within said migration passage (3), and transmission connecting rods (6) are arranged between each buffering plate (5), and rotationally connected to the sides of said buffering plates (5).

9. The buffering method of claim 8, wherein the crank rocker mechanism (8) is further arranged inside said migration passage (3), and the input end of one of said buffering plates (5) is connected to the output end of the crank rocker mechanism (8).

10. The buffering method of claim 9, wherein the input end of the crank rocker mechanism (8) is connected to the output end of the turbine deceleration device (9), the input end of the turbine deceleration device (9) is connected to the output end of the flood discharging turbine (7), and the flood discharging turbine (7) and the turbine deceleration device (9) are both installed outside said fishway body (1).

11. The buffering method of claim 10, wherein a plurality of flood discharging turbines (7) are provided, shafts on both sides of the flood discharging turbines (7) are held in bearings on a mounting frame (16), a chain wheel (18) is installed on one side of each flood discharging turbine (7), and a plurality of chain wheels (18) are connected with each other by a transmission chain (19).

12. The buffering method of claim 10, wherein the crank rocker mechanism (8) includes a driving crank (11), one end of which is rotationally connected with the output end of the turbine deceleration device (9), and the other end of which is rotationally connected with one end of a crank linkage (13), the other end of the crank linkage (13) is rotationally connected to one end of a rocker (12), the other end of the rocker (12) is connected to the center of a first gear (20) by a rotary shaft, among said buffering plates (5), a pin shaft of one of the buffering plates (5) is connected to the center of a second gear (21), the first gear (20) and the second gear (21) mesh with each other, the rotary shaft of the rocker (12) and the pin shaft of said buffering plate (5) are both held on one side of said fishway body (1) by bearing frames.

13. The buffering method of claim 12, wherein the turbine deceleration device (9) includes a housing (10), inside which a second small gear (140) and a second big gear (150) are hinged, the second small gear (140) is coaxially fixed with a first big gear (15), which meshes with a first small gear (14), the first small gear (14) is coaxially fixed with the flood discharging turbine (7), the second small gear (140) meshes with the second big gear (150), which meshes with a driven gear (17) coaxially fixed with the driving crank (11).

14. The buffering method of claim 6, wherein said counterweighting floating dock (4) includes a floating tank (22) and a drainage pump (23), the floating tank (22) is rotationally connected with the lower end of said fishway body (1), and the drainage pump (23) is fixedly installed on the floating tank (22).

* * * * *